UNITED STATES PATENT OFFICE.

REINHARDT RAHR, OF MANITOWOC, WISCONSIN.

PROCESS OF MAKING COFFEE SUBSTITUTES.

SPECIFICATION forming part of Letters Patent No. 521,509, dated June 19, 1894.

Application filed October 10, 1892. Serial No. 448,423. (No specimens.)

*To all whom it may concern:*

Be it known that I, REINHARDT RAHR, of Manitowoc, Wisconsin, have invented a certain new and useful Process for the Manufacture of Coffee Substitutes, of which the following is a specification.

For a long time there have been produced and put upon the market various substitutes for coffee, such as chicory, rye, peas, &c., the use of which is deleterious. It has also been proposed to employ malt in the manufacture of a coffee substitute but the methods of manufacture which have been proposed are defective and if followed would result in a product as worthless as those above mentioned.

I have produced a substitute for coffee which is not injurious to health, but which, on the contrary, possesses highly beneficial qualities. This substance I make from barley malt by a peculiar process whereby the nutritious and health giving qualities of malt extract combined with the aroma of coffee are secured; and when the substitute is mixed with coffee in proper proportions the decoction is not only palatable but it is not distinguishable from pure coffee.

The substitute is of course, cheaper than high grade coffee but it is in no sense an adulteration and is put upon the market as a separate article of commerce.

My process is as follows: I take well prepared malt and steep it in cold water for a period of from six to eight hours; then separate the malt from the water and allow it to drain; then place the steeped or moistened malt in a properly constructed roaster and subject it to a low degree of heat which is gradually increased during a period of about one hour to 60° Reaumur. During this treatment a small proportion of the starch is converted into maltose. I then increase the heat and continue the treatment for a period of from three to four hours, stopping at a temperature short of carbonization, during which treatment the maltose is converted into caramel and the remaining starch, dextrine and other malt products are changed chemically in such a way that they very strongly partake of the nature of coffee, while still retaining their nourishing and health giving properties.

The substitute when used alone is superior to any coffee substitute now on the market and when used in equal proportions with coffee the decoction cannot be distinguished from that of coffee.

I claim—

The herein described process of producing a substitute for coffee from barley malt which consists in steeping the malt, separating the steeped malt from the water, then subjecting the malt to a low degree of heat whereby the starch products are converted into maltose and then raising the temperature and continuing the treatment at the elevated temperature until the maltose is converted into caramel, and arresting the treatment at a point short of carbonization, substantially as described.

REINHARDT RAHR.

Witnesses:
C. C. LINTHICUM,
FREDERICK C. GOODWIN.